(12) United States Patent
Chien et al.

(10) Patent No.: US 12,688,708 B2
(45) Date of Patent: Jul. 21, 2026

(54) LANE LINE RECOGNITION METHOD, ELECTRONIC DEVICE AND STORAGE MEDIUM

(71) Applicant: HON HAI PRECISION INDUSTRY CO., LTD., New Taipei (TW)

(72) Inventors: Shih-Chao Chien, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 343 days.

(21) Appl. No.: 18/521,005

(22) Filed: Nov. 28, 2023

(65) Prior Publication Data

US 2024/0193964 A1 Jun. 13, 2024

(30) Foreign Application Priority Data

Dec. 8, 2022 (CN) .......................... 202211572580.2

(51) Int. Cl.
*G06V 20/56* (2022.01)
*G06V 10/776* (2022.01)
(52) U.S. Cl.
CPC .......... *G06V 20/588* (2022.01); *G06V 10/776* (2022.01)

(58) Field of Classification Search
CPC .... G06V 20/588; G06V 10/776; G06F 18/00; G06F 17/18; B60R 1/20; B60R 2300/607; G06T 15/20
See application file for complete search history.

(56) References Cited

FOREIGN PATENT DOCUMENTS

| CN | 107590438 | | | 1/2018 | | |
|----|-----------|---|---|--------|---|---|
| CN | 110443225 | | | 11/2019 | | |
| CN | 111126306 | A | * | 5/2020 | ............. | G06V 10/56 |
| CN | 111444778 | A | * | 7/2020 | ............. | G06V 10/56 |
| CN | 112654998 | A | * | 4/2021 | .......... | G06V 20/588 |
| CN | 115116017 | A | * | 9/2022 | ............. | G06V 10/26 |
| CN | 115731525 | A | * | 3/2023 | | |
| CN | 114882183 | B | * | 7/2025 | ............. | G01C 21/32 |

* cited by examiner

*Primary Examiner* — Xiao Liu
*Assistant Examiner* — Vaisali Rao Koppolu
(74) *Attorney, Agent, or Firm* — ScienBiziP, P.C.

(57) ABSTRACT

A lane line recognition method applied to an electronic device is provided. In the method, the electronic device obtains a target image comprising lane lines, and converts the target image into an aerial view of the lane lines. Once a left lane line curve and a right lane line curve are obtained by performing a curve fitting on the lane lines according to pixel points of the aerial view, the electronic device determines whether a recognition of the lane lines is accurate according to the left lane line curve and the right lane line curve.

18 Claims, 3 Drawing Sheets

LANE LINE RECOGNITION METHOD, ELECTRONIC DEVICE AND STORAGE MEDIUM

FIELD

The present disclosure relates to the field of intelligent driving technology, in particular to a lane line recognition method, an electronic device, and a storage medium.

BACKGROUND

Most of lane line detection methods use traditional image processing methods or deep learning models. First, a lane line is roughly segmented from an image, pixel points of the lane line are extracted, and the pixel points are fitted into a curve. However, in practical applications, a detection of the lane line is easily affected by an interference of external environments, especially when an advanced driving assistance system (ADAS) based on lane lines for assisting driving is using. If lane lines are not clearly identified, not only affects a driving experience, but also results driving safety issues.

DETAILED DESCRIPTION

In order to more clearly understand the above objects, features and advantages of the present disclosure, the present disclosure will be described in detail below in conjunction with the accompanying drawings and specific embodiments. In the case of no conflict, the embodiments of the present disclosure and the features in the embodiments can be combined with each other.

Many specific details are set forth in the following description to facilitate a full understanding of the disclosure, and the described embodiments are only some of the embodiments of the disclosure, rather than all of the embodiments. Based on the embodiments in this disclosure, all other embodiments obtained by persons of ordinary skill in the art without making creative efforts belong to the scope of protection of this disclosure.

Unless otherwise defined, all technical and scientific terms used herein have the same meaning as commonly understood by one of ordinary skill in the technical field to which this disclosure belongs. The terms used herein in the specification of the disclosure are only for the purpose of describing specific embodiments, and are not intended to limit the disclosure.

The terms "first", "second" and "third" in the specification and claims of the present disclosure and the above drawings are used to distinguish different objects, rather than to describe a specific order. Furthermore, the term "comprise", as well as any variations thereof, is intended to cover a non-exclusive inclusion. For example, a process, a method, a system, a product or a device comprising a series of blocks or units is not limited to the listed blocks or units, but optionally also includes unlisted blocks or units, or optionally further includes other blocks or units inherent in these processes, methods, products or apparatuses.

Most of lane line detection methods use traditional image processing methods or deep learning models. First, a lane line is roughly segmented from an image, pixel points of the lane line are extracted, and the pixel points are fitted into a curve. However, these methods do not determine whether a lane line is fitted error in real time, which may affect driving safety due to improper control of a vehicle when using an advanced driving assistance system (ADAS) for assisting driving. It also affects a riding experience of a passenger.

In order to improve an accuracy of detecting a lane line, the present disclosure provides a lane line recognition method, which can determine whether a recognition of the lane line is accurate by analyzing an image of the lane line, thereby avoiding wrongly recognizing a lane line and affects driving safety.

In order to make the purpose, technical solution and advantages of the lane line recognition method provided by the embodiment of the present disclosure clearer, the following describes in detail with reference to the accompanying drawings and specific embodiments.

Figure 1:
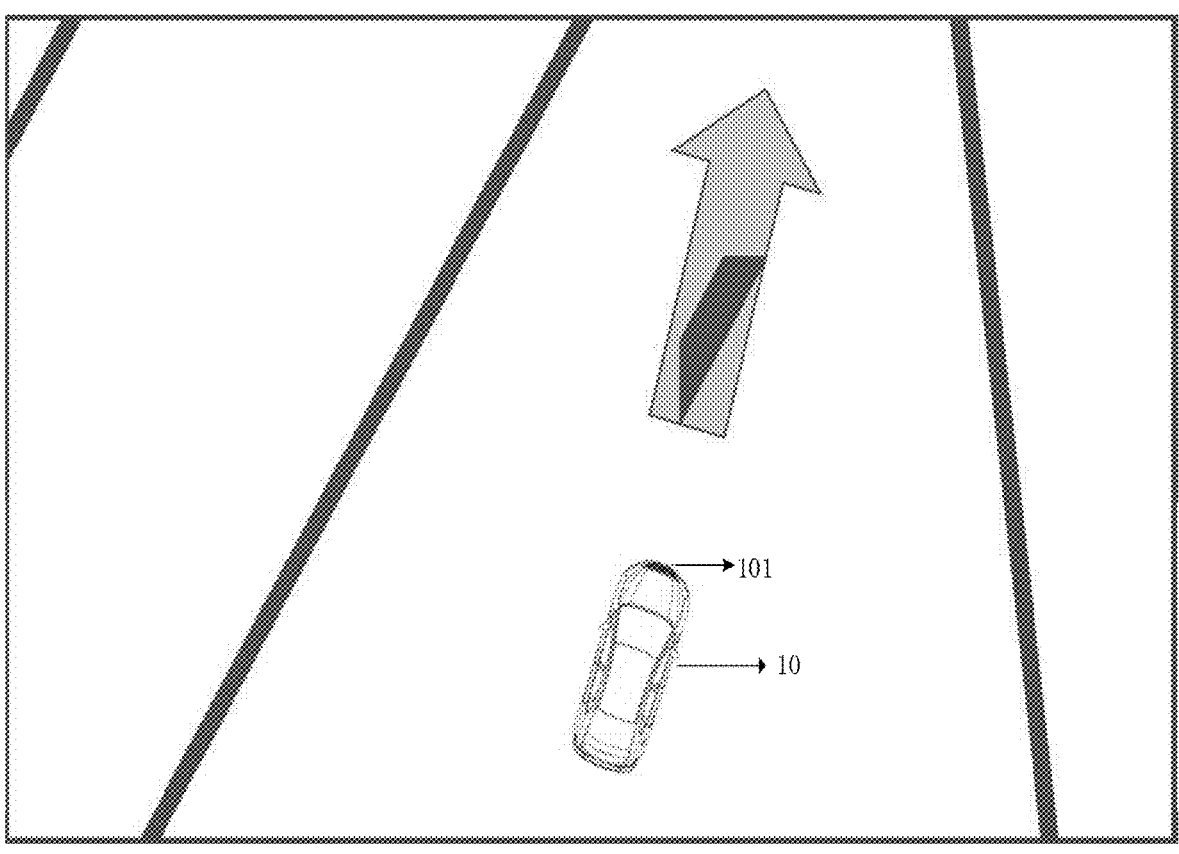
FIG. 1 is a schematic diagram of a scene of a lane line recognition method provided by an embodiment.

FIG. 1 is a schematic diagram of a scene of a lane line recognition method provided by an embodiment. The lane line recognition method is applied to an electronic device (such as the electronic device 1 in FIG. 6), and the electronic device can be configured in a vehicle (such as the vehicle 10 shown in FIG. 1). For example, the electronic device can be a vehicle-mounted device (for example, a console in the vehicle), or can be an electronic device (for example, a computer, a laptop, a mobile phone, etc.) which can communicate with the vehicle 10, and can control the vehicle 10.

In a scene shown in FIG. 1, one or more photographing devices 101 are installed on the vehicle 10, the vehicle 10 can drive on a road, and each photographing device 101 can be used to capture images of an environment in which the vehicle 10 is located, for example, the one or more photographing devices 101 can capture images (hereinafter can be referred to as "lane line original images") of lane lines. The one or more photographing devices 101 may include visual sensors, or may be devices such as a driving recorders capable of photographing images. The one or more photographing devices 101 can be installed in a same position in the vehicle 10, but shoot in different orientations. The one or more photographing devices 101 can also be installed in different positions. For example, the one or more photographing devices 101 can be installed in a front, a rear and/or a roof of the vehicle 10, etc. A location of each of the one or more photographing devices 101 is not limited in the embodiments of the present disclosure. The one or more photographing devices 101 can capture images within a preset range around the vehicle 10 in real time or according to a preset period, and the captured images can be images of the surrounding environment, or images of lane lines.

The electronic device can construct a partial map of an environment where the vehicle 10 is located based on the captured images. In one embodiment, the electronic device may acquire an image (or called a front view) in front of the vehicle 10 through the photographing device 101, and identify pixel points of lane lines in a front direction of the vehicle 10 based on an image recognition model.

The electronic device may include a processor (such as a processor 12 in FIG. 6), and the processor may use the photographing device 101 to obtain the original image of the lane lines, and recognize the lane lines from the original image of the lane lines, to get a recognition result of the lane lines. For example, the processor 12 may recognize the lane lines by using a convolutional neural network (CNN).

Figure 2:
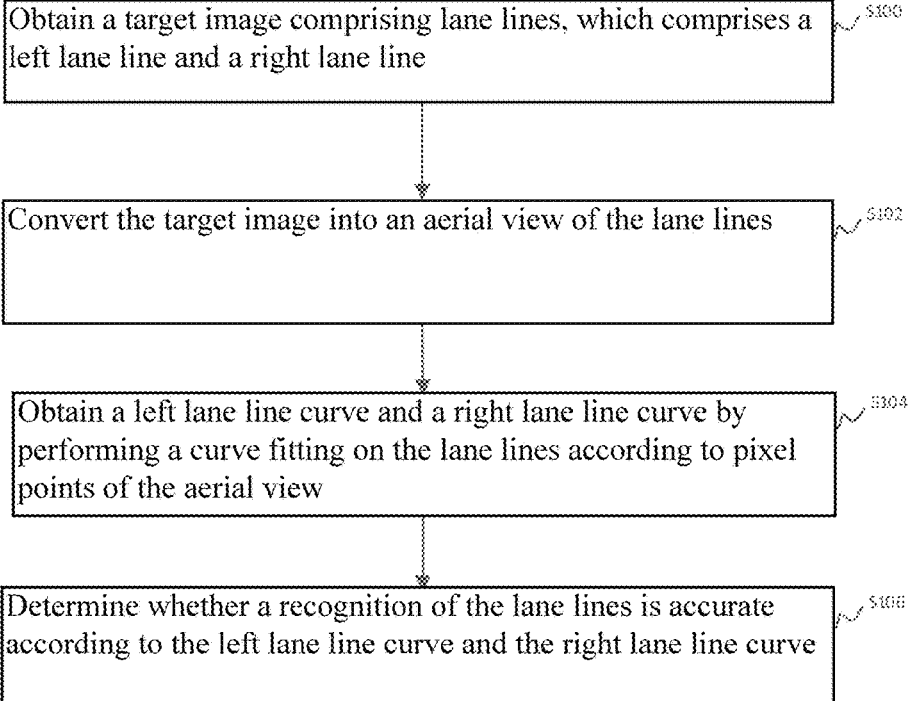
FIG. 2 is a flow chart of a lane line recognition method provided by an embodiment.

The electronic device in the embodiment of the present disclosure may be a vehicle computer, a mobile phone, a tablet computer, a desktop computer, a laptop computer, a handheld computer, a notebook computer, an ultra-mobile personal computer (UMPC), a netbook, and electronic devices such as cellular phones, personal digital assistants (PDAs), artificial intelligence (AI) devices, and wearable devices. The embodiment of the present disclosure does not specifically limit the specific form of the electronic device. The network where the electronic device is located includes, but is not limited to: the Internet, a wide area network, a metropolitan area network, a local area network, a virtual private network (VPN) and the like. As shown in FIG. 2, it is a flow chart of a lane line recognition method provided by an embodiment. The lane line recognition method can be applied to an electronic device (such as the electronic device 1 shown in FIG. 6). According to different requirements, the order of the blocks in the flowchart can be changed, and some blocks can be omitted.

S100, the electronic device acquires a target image including lane lines, where the lane lines include a left lane line and a right lane line of a lane on which the vehicle is located.

In one embodiment, the electronic device acquires the target image including lane lines according to a following detailed procedure. In the procedure, the electronic device obtains an original image by capturing a scene in front of the vehicle; extracts the lane lines from the original image, and converts the extracted lane lines as a binarized image; and obtains the target image by superimposing pixel points in the binarized image.

In one embodiment, the electronic device collects images in front of the vehicle through one or more photographing devices 101 mounted on the vehicle. In another embodiment, the electronic device may also shoot a video of the scene in front of the vehicle, and acquire the original image from the video.

Before extracting the lane lines from the original image, the electronic device may also perform preprocessing on the original image, including, but not limited to: image denoising, use a median filter in a nonlinear smoothing filter in a spatial filtering technology, that is, use the medianBlur_Sort-Net function in OpenCV to eliminate the noise in the original image, such that a boundary will not be blurred while eliminating the noise.

The electronic device divides the original image that has been preprocessed, and obtains a judgment result by determining an environmental condition according to light conditions when the original image is taken (for example, a light in cloudy weather and clear weather is different); performing edge detection using a discrete differential operator (soble), and on a basis of the edge detection, comprehensively using a local threshold method, a global threshold method and a dynamic threshold method, divides the original image into black regions and white regions according to a relationship between pixel values and a threshold value such that the original image is binarized and obtain the target image.

S102, the electronic device converts the target image into an aerial view of the lane lines.

In one embodiment, the electronic device may obtain the aerial view by performing perspective transformation on the target image. The aerial view is based on a perspective principle, and is a three-dimensional view drawn from a certain point on a height to overlook undulations of the ground, which is more realistic than a plan view.

In one embodiment, the electronic device obtains the aerial view by performing perspective transformation on the target image according to a following detailed procedure.

In the procedure, the electronic device determines non-zero pixel points from the target image and taking each of the non-zero pixel points as a target point, the non-zero pixel point being a pixel point of which at least one of an abscissa and an ordinate is not zero; obtains an inverse perspective transformation matrix according to a coordinate transformation formula and coordinates of each target point in the target image; and obtains the aerial view based on the inverse perspective transformation matrix.

Due to a fact that the lanes on a same road are approximately parallel, in some embodiments, the electronic device eliminates an interference caused by the surrounding environment and the sky in the aerial view obtained after the perspective effect using the perspective transformation, and retains an area of interest including lane information, thereby reducing complex background calculations and facilitating later lane line detection. The region of interest is a region from which lane lines can be extracted.

S104, the electronic device obtains a left lane line curve and a right lane line curve by performing a curve fitting on the lane lines according to the pixel points of the aerial view.

As when the vehicle is running, the lane lines appear as curves with longitudinal trend, and the lane lines usually does not have a large degree of curvature in a short distance, so it is approximately a straight line in a short distance. In the aerial view, it appears as a line that is nearly perpendicular to a bottom of the target image. Based on the above characteristics, since a bottom half of the aerial view may be an area closest to the vehicle, the electronic device may generate a non-zero pixel point distribution map for the bottom half of the aerial view.

In one embodiment, the electronic device establishes the non-zero pixel point distribution map for the non-zero pixel points corresponding to the bottom half of the aerial view according to a following detailed procedure. In the procedure, the electronic device obtains a first peak value and a second peak value by accumulating a number of non-zero pixel points in each column in the aerial view. The first peak value may be a peak value corresponding to a left area of the non-zero pixel point distribution map, the second peak value may be a peak value corresponding to a right area of the non-zero pixel point distribution map, and the first peak value is on a left side of the second peak, according to characteristics of the lane line, there is a certain distance between a position of the first peak and a position of the second peak.

In order to improve an accuracy of identifying lane lines, the electronic device determines an initial position (hereinafter referred to as "first initial position") of the left lane line in the aerial view according to the first peak value, and determines an initial position (hereinafter referred to as "second initial position") of the right lane line in the aerial view according to the second peak value. The electronic device takes the first initial position as an initial position of a first sliding window, and takes the second initial position as an initial position of a second sliding window. Wherein, the first initial position and the second initial position may be positions relatively close to a shooting position (i.e., a position at which the vehicle is located).

In one embodiment, a sliding window can be used to determine lane lines by searching for pixel points on the lane lines. A direction of searching for the lane lines may be a direction extending along the lane lines. The first sliding window is used for searching the first lane line starting from the first initial position. The electronic device may preset a size of the first sliding window to be a first size; and preset a size of the second sliding window to be a second size, the first size may be the same as the second size, or the first size may be different from the second size. In this embodiment, the electronic device may set a longitudinal width of the first sliding window as a sliding distance (hereinafter referred to as "first sliding distance") of the first sliding window. For example, if a width of the first sliding window equals 200 pixel points, then the sliding distance equals 200 pixel points. The electronic device may set a longitudinal width of the second sliding window as a sliding distance (hereinafter referred to as "second sliding distance") of the second sliding window.

In a specific embodiment, the first sliding window is taken as an example for illustration. During a movement of the first sliding window in the aerial view, the electronic device fits all non-zero pixel points included in the first sliding window to be a first curve. Taking the first sliding window at the first initial position as an example, specifically: the electronic device determines an abscissa according to the first initial position and the second initial position, and takes the determined abscissa as an abscissa (hereinafter referred to as "first abscissa") of a center of the first sliding window being at the first initial position. According to the first sliding distance and the first abscissa, the electronic device calculates non-zero pixel points included in the first sliding window when the first sliding window is at the first initial position, and obtains the first curve corresponding to a current position of the first sliding window by fitting the calculated non-zero pixel points.

The electronic device dynamically adjusts a sliding of the first sliding window according to the first curve, including: calculating an abscissa (hereinafter referred to as "second abscissa") of the first sliding window being at a next position (also referred to as "a second sliding position") according to the first curve and the first sliding distance; sliding the first sliding window to the second sliding position based on the second abscissa, wherein when the first sliding window slides to the second sliding position, an abscissa of a center of the first sliding window equals the second abscissa; and obtaining the first curve by fitting all non-zero pixel points included in the first sliding window being at the first initial position and all non-zero pixel points included in the first sliding window being at the second sliding position.

For example: the first curve is $y=p(x)$, an abscissa x of a center of the first sliding window is determined according to a first sliding distance y, and when the abscissa of the first sliding window at the second sliding position is determined, the non-zero pixel points included in the first sliding window at the first sliding position and the non-zero pixel points included in the first sliding window at a current position (i.e., the second sliding position) are fitted into the first curve.

In this embodiment, a position of the center of the first sliding window determines the sliding position of the first sliding window, and the sliding position of the first sliding window is determined by the first curve. The method described in this embodiment can also better find the position of the lane line when cornering, avoiding omissions and inaccurate recognition.

In one embodiment, according to the moving process of the second sliding window in the aerial view, according to all the non-zero pixel points included in the second sliding window to fit the second curve, including: the electronic device acquires non-zero pixel points used for fitting the first curve; calculating a first total number of non-zero pixel points included in the second sliding window; if the first total number of non-zero pixel points in the second sliding window is greater than or equal to a preset threshold, fitting the non-zero pixel points used for fitting the first curve and the non-zero pixel points included in the second sliding window into the second curve.

The non-zero pixel points used for fitting the first curve may include non-zero pixel points included in the first sliding window when the first sliding window is at the first position, or may include non-zero pixel points included in the first sliding window when the first sliding window is at a current position and non-zero pixel points included in the first sliding window when the first sliding window is at all positions before the current position.

The electronic device calculates the first total number of non-zero pixel points in the second sliding window according to a following detailed procedure. In the procedure, the electronic device calculates a second total number of predetermined pixel points, the predetermined pixel points refer to non-zero pixel points used for fitting the first curve before the second sliding window sliding to the current position; and calculates the first total number of non-zero pixel points in the second sliding window according to the second total number of non-zero pixel points.

In one embodiment, the electronic device calculates the first total number of non-zero pixel points in the second sliding window according to the second total number of non-zero pixel points by taking the first total number equals the second total number.

In one embodiment, if the first total number is less than a preset threshold, the electronic device does not fit the first total number of non-zero pixel points in the second sliding window.

The above only shows the fitting between sliding windows corresponding to two positions. The first curve described in this embodiment can be fitted according to non-zero pixel points included in the first sliding window, or can be obtained according to the non-zero pixel points included in the first sliding window being at the first sliding position and the second sliding position. In this embodiment, the sliding position of the first sliding window can be obtained according to the first curve and the first sliding distance, so as to avoid inaccurate recognition due to omission.

Figure 3:
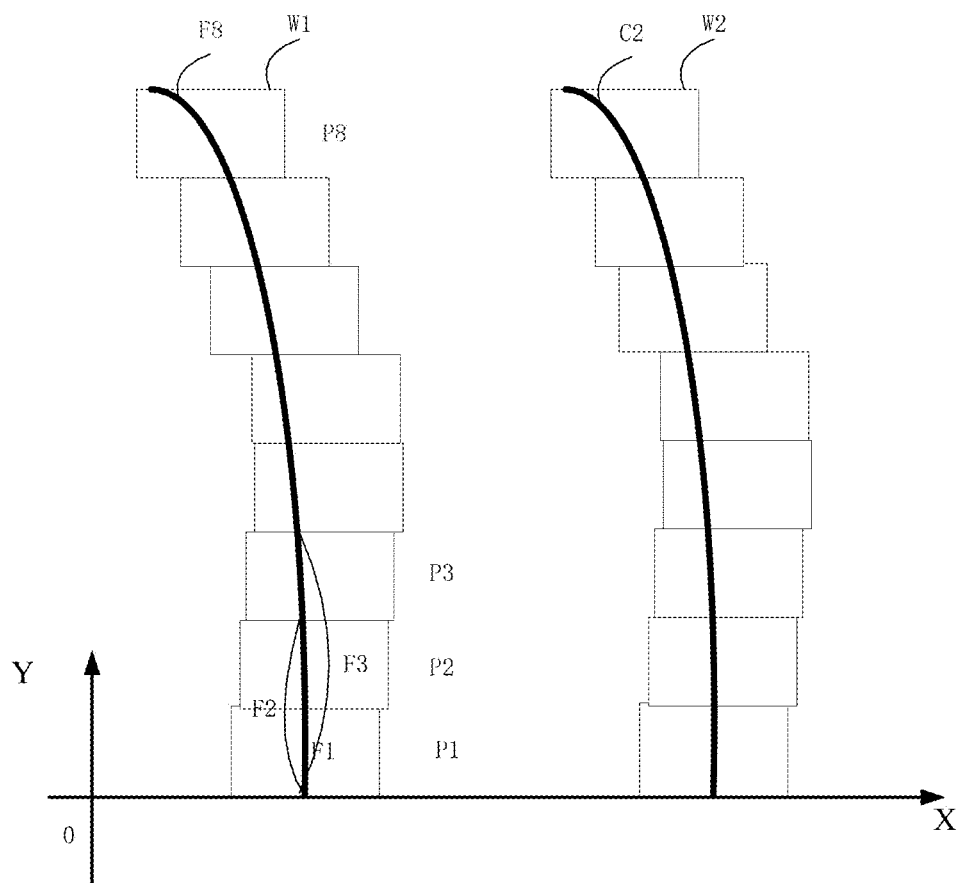
FIG. 3 is a schematic diagram of fitted lane line curves provided by the embodiment of the present disclosure.

FIG. 3 is a schematic diagram of fitting the first curve using non-zero pixel points included in the first sliding window and the second sliding window. Referring to FIG. 3, the first sliding window W1 slides to positions P1, P2 and P3 in sequence. In one embodiment, taking the fitting of a left lane line C1 as an example, a first curve F1 is fitted based on the non-zero pixel points included in the first sliding window W1 at a position P1 by using the least square method. According to the first curve F1 and the ordinate of the center of the first sliding window W1 at the position P2, the electronic device calculates an abscissa of the center of the first sliding window W1 at the position P2, and further calculates the total number of non-zero pixel points in the first sliding window W1 when the first sliding window W1 is at the position P2; the electronic device obtains a first curve F2 by fitting the non-zero pixel points in the first sliding window W1 at the position P1 and the non-zero pixel points in the first sliding window W1 at the position P2 using the least square method. According to the first curve F2 and the ordinate of the center of the first sliding window W1 at the position P2, the electronic device calculates the abscissa of the center of the first sliding window W1 at the position P3; the electronic device further calculates the total number of non-zero pixel points in the first sliding window W1 when the first sliding window W1 is at position P3; the non-zero pixel points in the first sliding window W1 when the first sliding window W1 is at the position P1, the non-zero pixel points in the first sliding window W1 when the first sliding window W1 is at the position P2, and the non-zero pixel points in the first sliding window W1 when the first sliding window W1 is at the position P3 are fitted to a first curve F3 by the electronic device. Similarly, the electronic device obtains a first curve F1 corresponding to the first sliding window W1 at a position P1, wherein i represents a positive integer. For example, the first curve F8 is corresponding to the first sliding window W1 at the position P8.

That is, the electronic device can generate a non-zero pixel point distribution map a number of non-zero pixel points in each column in the aerial view, the non-zero pixel point distribution map including a first peak value and a second peak value, and the first peak value being located on a left of the second peak value; determine a first initial position of the left lane line in the aerial view according to the first peak value, and determine a second initial position of the right lane line in the aerial view according to the second peak value; slide a first sliding window based on the first initial position, and slide a second sliding window based on the second initial position; fitting all non-zero pixel points included in the first sliding window to be a first curve during a sliding of the first sliding window in the aerial view, and take the first curve as the left lane line curve; and fit all non-zero pixel points included in the second sliding window to be a second curve during a sliding of the second sliding window in the aerial view, and take the second curve as the right lane line curve, wherein a sliding of the second sliding window is adjusted according to the first curve.

The method described in this embodiment makes the lane lines obtained by sliding windows more accurate, and can better find the position of the lane lines when turning, so as to avoid omission and cause inaccurate recognition.

Use the sliding window to fit the lane line, according to the first sliding window at the current position and all previous positions, all non-zero pixel points in the first sliding window are fitted into the first curve and the position of the center of the first sliding window determined according to the first curve improves the accuracy of fitting lane lines. The electronic device takes the first curve as the left lane line curve and takes the second curve as the right lane line curve.

S106, the electronic device determines whether a recognition of the lane lines is accurate according to the left lane line curve and the right lane line curve.

In one embodiment, the electronic device determines whether the recognition of the lane lines is accurate according to the left lane line curve and the right lane line curve according to a following detailed procedure. In the procedure, the electronic device determines whether there is an intersection point between the left lane line curve and the right lane line curve; if there is the intersection point between the left lane line curve and the right lane line curve, determines that the identification of the lane lines is inaccurate; if there is no intersection point between the left lane line curve and the right lane line curve, determines whether a curvature of the left lane line curve and a curvature of the right lane line curve are the same; if the curvature of the left lane line curve and the curvature of the right lane line curve are different, determines that the recognition of the lane lines is inaccurate. if there is no intersection point between the left lane line curve and the right lane line curve, and if the curvature of the left lane line curve and the curvature of the right lane line curve are same, determines that the recognition of the lane lines is accurate.

The determining of whether there is the intersection point between the left lane line curve and the right lane line curve includes: acquiring a plurality of pixel points on the left lane line curve, acquiring a plurality of pixel points on the right lane line curve; determining whether there is the intersection between the left lane line curve and the right lane line curve according to the plurality of pixel points on the left lane line curve and the plurality of pixel points on the right lane line curve. In one embodiment, the plurality of pixel points on the left lane line curve includes all pixel points on the left lane line curve, and the plurality of pixel points on the right lane line curve includes all pixel points on the right lane line curve.

In one embodiment, if at least one pixel point of the plurality of pixel points on the left lane line curve is same as at least one pixel point of the plurality of pixel points on the right lane line curve, the electronic device determines that there is the intersection between the left lane line curve and the right lane line curve.

The electronic device determines whether the curvature of the left lane line curve and the curvature of the right lane line curve are the same according to a following detailed procedure. In the procedure, the electronic device obtains a coefficient a1 of a highest order term of an equation of the left lane line curve; obtains a coefficient a2 of a highest order term of an equation of the right lane line curve; calculates an absolute value $|a1-a2|$; if the absolute value is greater than a preset threshold, determines that the curvature of the left lane line curve and the curvature of the right lane line curve are different.

Optionally, the threshold may be 0.001.

The electronic device obtains the coefficient a1 of the highest order term of the equation of the left lane line curve by extracting two pixel points (hereinafter referred to as "first pixel points") on the left lane line, and calculating the coefficient of the highest order term of the equation of the left lane line curve according to the coordinates of the two first pixel points.

The electronic device obtains the coefficient a2 of the highest order term of the equation of the right lane line curve by extracting two pixel points (hereinafter referred to as "second pixel points") on the right lane line, and calculating the coefficient of the highest order term of the equation of the right lane line curve according to the coordinates of the two second pixel points.

Figure 4:
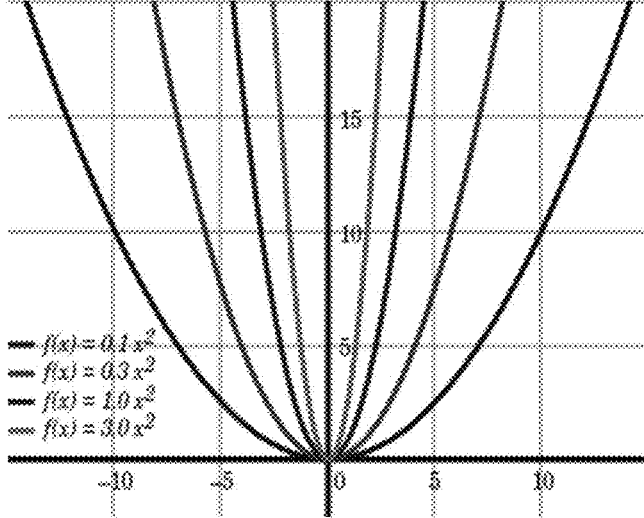
FIG. 4 is a schematic diagram of a curvature of a lane line provided by the embodiment of the present disclosure.

For clearly illustrating the present embodiment, if the equation of the left lane line curve is $f1(x)=a1\times2+b1x+c1$, and the equation of the right lane line curve is $f2(x)=a2x2+b2x+c2$, the highest order coefficient of the equation of a curve represents a size of an opening of the curve, taking FIG. 4 as an example, FIG. 4 is a schematic diagram of the lane line curve. When the highest order coefficient of the equation of the curve is different, and the opening is different.

If the absolute value of a difference between the coefficient of the highest sub-term of the equation f1(x) of the left lane line curve and the coefficient of the highest sub-term of the equation f2(x) of the right lane line curve is less than the preset threshold, then the size of the opening of the left lane line curve is close to the size of the opening of the right lane line curve, that is, the left lane line curve and the right lane line curve are approximately parallel, and the electronic device can determine that the recognition of the left lane line and the right lane line have high reliability.

The present disclosure improves the accuracy of recognizing the lane lines, ensure the safety of the vehicle during driving.

The lane line recognition method provided by the disclosed embodiment can be applied to an intelligent driving platform. The intelligent driving platform collects information such as various road surfaces and road conditions, and identifies and filters abnormal information or wrong information in the collected information. Thereby providing route planning, map navigation and other functions for different vehicles. Specifically, in conjunction with the disclosed embodiments, the intelligent driving platform can identify abnormal lane lines in various lanes, thereby avoiding taking the occurrence of road marks (such as road stains, road markings, etc.) as lane lines, such that a planning of a path can be more correct, which improves the safety of driving.

Figure 5:
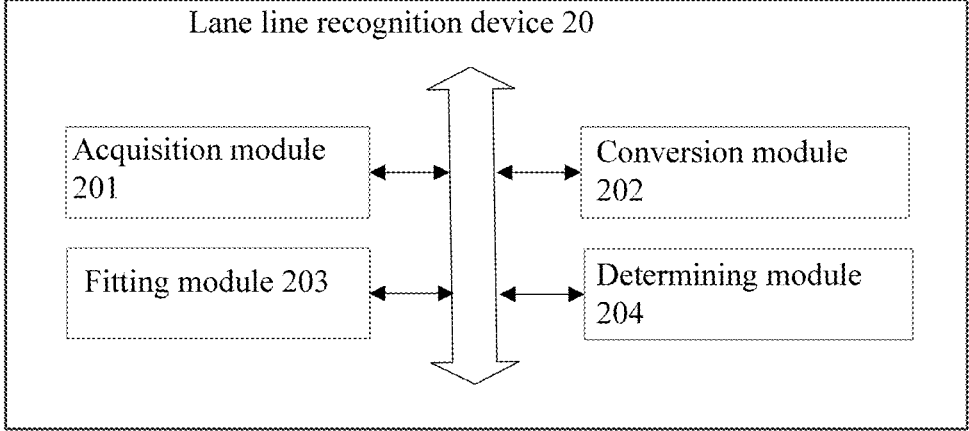
FIG. 5 is a schematic diagram of a lane line recognition device provided by an embodiment.

As shown in FIG. 5, it is a functional block diagram of a preferred embodiment of a lane line recognition device of the present disclosure. The lane line recognition device 20 includes an acquisition module 201, a conversion module 202, a fitting module 203, and a determining module 204. In this embodiment, the functions of each module/unit will be described in detail in subsequent embodiments.

The acquisition module 201, is configured to acquire a target image including lane lines, where the lane lines include a left lane line and a right lane line;

The conversion module 202, is configured to convert the target image into an aerial view of the lane lines;

The fitting module 203, is configured to perform a curve fitting on the lane lines according to the pixel points of the aerial view, to obtain a left lane line curve and a right lane line curve;

The determining module 204 is configured to judge whether a recognition of the lane lines is accurate according to the left lane line curve and the right lane line curve.

Figure 6:
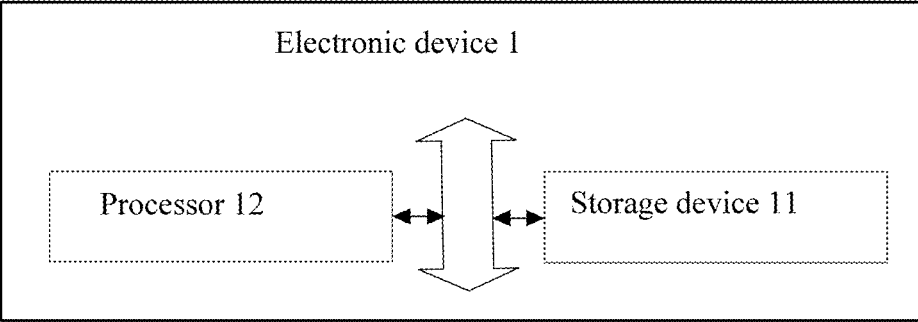
FIG. 6 is a schematic structural diagram of an electronic device provided by an embodiment.

Referring to FIG. 6, the electronic device 1 includes a storage device 11 and at least one processor 12. Those skilled in the art should understand that the structure of the electronic device 1 shown in FIG. 6 does not constitute a limitation of the embodiment of the present disclosure, and the electronic device 1 may also include more or less other hardware or software than that in FIG. 6, or have different component arrangements.

The processor 12 in the electronic device 1 can implement the lane line recognition method when executing a computer program, and the computer program includes the lane line recognition device 20. The modules/units mentioned in this disclosure refer to a series of computer program segments that can be executed by the processor 12 and can complete fixed functions, and are stored in the storage device 12.

In this embodiment, the storage device 11 may be an internal storage device of the electronic device 1, that is, a storage device built in the electronic device 1. In other embodiments, the storage device 11 may also be an external storage device of the electronic device 1, that is, a storage device external to the electronic device 1. In some embodiments, the storage device 11 is used to store program codes and various data, such as the lane line recognition device 20 installed in the electronic device 1, and realize high-speed, automatic complete program or data access.

The storage device 11 may include random access memory, and may also include non-volatile memory, such as hard disk, internal memory, plug-in hard disk, smart media card (SMC), secure digital (SD) card, a flash memory card (Flash Card), at least one magnetic disk storage device, flash memory device, or other volatile solid-state storage devices.

In one embodiment, the processor 12 may be a central processing unit (CPU), and may also be other general-purpose processors, digital signal processors (DSP), application-specific integrated circuits (ASIC), Field-Programmable Gate Array (FPGA) or other programmable logic devices, discrete gate or transistor logic devices, discrete hardware components, etc. The general-purpose processor may be a microprocessor, or the processor may be any other conventional processor and the like.

If the program codes and various data in the storage device 11 are implemented in the form of software function units and sold or used as independent products, they can be stored in a computer-readable storage medium. Based on this understanding, this disclosure implements all or part of the processes in the methods of the above embodiments, such as the lane line recognition method, which can also be completed by instructing related hardware through computer programs, and the computer programs can be stored in computer-readable storage. In the medium, when the computer program is executed by a processor, the steps of the above-mentioned various method embodiments can be realized. Wherein, the computer program includes computer program code, and the computer program code may be in the form of source code, object code, executable file or some intermediate form. The computer readable medium may include: any entity or device capable of carrying the computer program code, recording medium, U disk, removable hard disk, magnetic disk, optical disk, computer memory, read-only memory (ROM) wait.

It can be understood that the module division described above is a logical function division, and there may be another division method in actual implementation. In addition, each functional module in each embodiment of the present disclosure may be integrated into the same processing unit, or each module may exist separately physically, or two or more modules may be integrated into the same unit. The above-mentioned integrated modules can be implemented in the form of hardware, or in the form of hardware plus software function modules.

Finally, it should be noted that the above embodiments are only used to illustrate the technical solutions of the present disclosure and not to limit them. Although the present disclosure has been described in detail with reference to the preferred embodiments, those skilled in the art should understand that the technical solutions of the present disclosure can be Modifications or equivalent replacements may be made without departing from the spirit and scope of the technical solutions disclosed herein.

What is claimed is:

1. A lane line recognition method applied to an electronic device, the method comprising:

obtaining a target image comprising lane lines, which comprises a left lane line and a right lane line;

converting the target image into an aerial view of the lane lines;

obtaining a left lane line curve and a right lane line curve by performing a curve fitting on the lane lines according to pixel points of the aerial view; and determining whether a recognition of the lane lines is accurate according to the left lane line curve and the right lane line curve, and comprising:

determining whether there is an intersection point between the left lane line curve and the right lane line curve;

determining that the identification of the lane lines is inaccurate in response that there is the intersection point between the left lane line curve and the right lane line curve;

in response that there is no intersection point between the left lane line curve and the right lane line curve, determining whether a curvature of the left lane line curve and a curvature of the right lane line curve are the same according to a coefficient of an equation of the left lane line curve and a coefficient of an equation of the right lane line curve; and determining that the recognition of the lane lines is inaccurate in response that the curvature of the left lane line curve and the curvature of the right lane line curve are different.

2. The lane line recognition method according to claim 1, wherein the obtaining of the target image comprising the lane lines comprises:

obtaining an original image by capturing a scene in front of the vehicle;

extracting the lane lines from the original image;

converting the extracted lane lines as a binarized image; and obtaining the target image by superimposing pixel points in the binarized image.

3. The lane line recognition method according to claim 1, wherein the converting of the target image into the aerial view of the lane lines comprises:

determining non-zero pixel points from the target image and taking each of the non-zero pixel points as a target point, the non-zero pixel point being a pixel point of which at least one of an abscissa and an ordinate is not zero;

obtaining an inverse perspective transformation matrix according to a coordinate transformation formula and coordinates of each target point in the target image; and obtaining the aerial view based on the inverse perspective transformation matrix.

4. The lane line recognition method according to claim 1, wherein the obtaining of the left lane line curve and the right lane line curve by performing the curve fitting on the lane lines according to the pixel points of the aerial view comprises:

generating a non-zero pixel point distribution map according to a number of non-zero pixel points in each column in the aerial view, the non-zero pixel point distribution map comprising a first peak value and a second peak value, and the first peak value being located on a left of the second peak value;

determining a first initial position of the left lane line in the aerial view according to the first peak value, and determining a second initial position of the right lane line in the aerial view according to the second peak value;

sliding a first sliding window based on the first initial position, and sliding a second sliding window based on the second initial position;

fitting all non-zero pixel points included in the first sliding window to be a first curve during a sliding of the first sliding window in the aerial view, and taking the first curve as the left lane line curve; and fitting all non-zero pixel points included in the second sliding window to be a second curve during a sliding of the second sliding window in the aerial view, and taking the second curve as the right lane line curve, wherein a sliding of the second sliding window is adjusted according to the first curve.

5. The lane line recognition method according to claim 1, wherein the determining of whether there is the intersection point between the left lane line curve and the right lane line curve comprises:

acquiring a plurality of pixel points on the left lane line curve, acquiring a plurality of pixel points on the right lane line curve; and determining whether there is the intersection between the left lane line curve and the right lane line curve according to the plurality of pixel points on the left lane line curve and the plurality of pixel points on the right lane line curve.

6. The lane line recognition method according to claim 1, wherein the determining of whether the curvature of the left lane line curve and the curvature of the right lane line curve are the same according to the coefficient of the equation of the left lane line curve and the coefficient of the equation of the right lane line curve comprises:

obtaining a coefficient a1 of a highest order term of the equation of the left lane line curve;

obtaining a coefficient a2 of a highest order term of the equation of the right lane line curve;

calculating an absolute value $|a1-a2|$; and determining that the curvature of the left lane line curve and the curvature of the right lane line curve are different in response that the absolute value is greater than a preset threshold.

7. An electronic device comprising:

a storage device;

at least one processor; and the storage device storing one or more programs, which when executed by the at least one processor, cause the at least one processor to:

obtain a target image comprising lane lines, which comprises a left lane line and a right lane line;

convert the target image into an aerial view of the lane lines;

obtain a left lane line curve and a right lane line curve by performing a curve fitting on the lane lines according to pixel points of the aerial view; and determine whether a recognition of the lane lines is accurate according to the left lane line curve and the right lane line curve, and comprising:

determining whether there is an intersection point between the left lane line curve and the right lane line curve;

determining that the identification of the lane lines is inaccurate in response that there is the intersection point between the left lane line curve and the right lane line curve;

in response that there is no intersection point between the left lane line curve and the right lane line curve, determining whether a curvature of the left lane line curve and a curvature of the right lane line curve are the same according to a coefficient of an equation of the left lane line curve and a coefficient of an equation of the right lane line curve; and determining that the recognition of the lane lines is inaccurate in response that the curvature of the left lane line curve and the curvature of the right lane line curve are different.

8. The electronic device according to claim 7, wherein the at least one processor acquires the target image comprising the lane lines by:

obtaining an original image by capturing a scene in front of the vehicle;

extracting the lane lines from the original image;

converting the extracted lane lines as a binarized image; and obtaining the target image by superimposing pixel points in the binarized image.

9. The electronic device according to claim 7, wherein the at least one processor converts the target image into the aerial view of the lane lines by:

determining non-zero pixel points from the target image and taking each of the non-zero pixel points as a target point, the non-zero pixel point being a pixel point of which at least one of an abscissa and an ordinate is not zero;

obtaining an inverse perspective transformation matrix according to a coordinate transformation formula and coordinates of each target point in the target image; and obtaining the aerial view based on the inverse perspective transformation matrix.

10. The electronic device according to claim 7, wherein the at least one processor obtains the left lane line curve and the right lane line curve by performing the curve fitting on the lane lines according to the pixel points of the aerial view by:

generate a non-zero pixel point distribution map according to a number of non-zero pixel points in each column in the aerial view, the non-zero pixel point distribution map comprising a first peak value and a second peak value, and the first peak value being located on a left of the second peak value;

determine a first initial position of the left lane line in the aerial view according to the first peak value, and determine a second initial position of the right lane line in the aerial view according to the second peak value;

slide a first sliding window based on the first initial position, and slide a second sliding window based on the second initial position;

fit all non-zero pixel points included in the first sliding window to be a first curve during a sliding of the first sliding window in the aerial view, and take the first curve as the left lane line curve; and fit all non-zero pixel points included in the second sliding window to be a second curve during a sliding of the second sliding window in the aerial view, and take the second curve as the right lane line curve, wherein a sliding of the second sliding window is adjusted according to the first curve.

11. The electronic device according to claim 7, wherein the at least one processor determines whether there is the intersection point between the left lane line curve and the right lane line curve by:

acquiring a plurality of pixel points on the left lane line curve, acquiring a plurality of pixel points on the right lane line curve; and determining whether there is the intersection between the left lane line curve and the right lane line curve according to the plurality of pixel points on the left lane line curve and the plurality of pixel points on the right lane line curve.

12. The electronic device according to claim 7, wherein the at least one processor determines whether the curvature of the left lane line curve and the curvature of the right lane line curve are the same according to the coefficient of the equation of the left lane line curve and the coefficient of the equation of the right lane line curve by:

obtaining a coefficient a1 of a highest order term of the equation of the left lane line curve;

obtaining a coefficient a2 of a highest order term of the equation of the right lane line curve;

calculating an absolute value |a1−a2|; and determining that the curvature of the left lane line curve and the curvature of the right lane line curve are different in response that the absolute value is greater than a preset threshold.

13. A non-transitory storage medium having instructions stored thereon, when the instructions are executed by a processor of an electronic device, the processor is caused to perform a lane line recognition method, wherein the method comprises:

obtaining a target image comprising lane lines, which comprises a left lane line and a right lane line;

converting the target image into an aerial view of the lane lines;

obtaining a left lane line curve and a right lane line curve by performing a curve fitting on the lane lines according to pixel points of the aerial view; and determining whether a recognition of the lane lines is accurate according to the left lane line curve and the right lane line curve, and comprising:

determining whether there is an intersection point between the left lane line curve and the right lane line curve;

determining that the identification of the lane lines is inaccurate in response that there is the intersection point between the left lane line curve and the right lane line curve;

in response that there is no intersection point between the left lane line curve and the right lane line curve, determining whether a curvature of the left lane line curve and a curvature of the right lane line curve are the same according to a coefficient of an equation of the left lane line curve and a coefficient of an equation of the right lane line curve; and determining that the recognition of the lane lines is inaccurate in response that the curvature of the left lane line curve and the curvature of the right lane line curve are different.

14. The non-transitory storage medium according to claim 13, wherein the obtaining of the target image comprising the lane lines comprises:

obtaining an original image by capturing a scene in front of the vehicle;

extracting the lane lines from the original image;

converting the extracted lane lines as a binarized image; and obtaining the target image by superimposing pixel points in the binarized image.

15. The non-transitory storage medium according to claim 13, wherein the converting of the target image into the aerial view of the lane lines comprises:

determining non-zero pixel points from the target image and taking each of the non-zero pixel points as a target point, the non-zero pixel point being a pixel point of which at least one of an abscissa and an ordinate is not zero;

obtaining an inverse perspective transformation matrix according to a coordinate transformation formula and coordinates of each target point in the target image; and obtaining the aerial view based on the inverse perspective transformation matrix.

16. The non-transitory storage medium according to claim 13, wherein the obtaining of the left lane line curve and the right lane line curve by performing the curve fitting on the lane lines according to the pixel points of the aerial view comprises:

generating a non-zero pixel point distribution map according to a number of non-zero pixel points in each column in the aerial view, the non-zero pixel point distribution map comprising a first peak value and a second peak value, and the first peak value being located on a left of the second peak value;

determining a first initial position of the left lane line in the aerial view according to the first peak value, and determining a second initial position of the right lane line in the aerial view according to the second peak value;

sliding a first sliding window based on the first initial position, and sliding a second sliding window based on the second initial position;

fitting all non-zero pixel points included in the first sliding window to be a first curve during a sliding of the first sliding window in the aerial view, and taking the first curve as the left lane line curve; and fitting all non-zero pixel points included in the second sliding window to be a second curve during a sliding of the second sliding window in the aerial view, and taking the second curve as the right lane line curve, wherein a sliding of the second sliding window is adjusted according to the first curve.

17. The non-transitory storage medium according to claim 13, wherein the determining of whether the curvature of the left lane line curve and the curvature of the right lane line curve are the same according to the coefficient of the equation of the left lane line curve and the coefficient of the equation of the right lane line curve comprises:

obtaining a coefficient a1 of a highest order term of the equation of the left lane line curve;

obtaining a coefficient a2 of a highest order term of the equation of the right lane line curve;

calculating an absolute value $|a1-a2|$; and determining that the curvature of the left lane line curve and the curvature of the right lane line curve are different in response that the absolute value is greater than a preset threshold.

18. The non-transitory storage medium according to claim 13, wherein the determining of whether there is the intersection point between the left lane line curve and the right lane line curve comprises:

acquiring a plurality of pixel points on the left lane line curve, acquiring a plurality of pixel points on the right lane line curve; and determining whether there is the intersection between the left lane line curve and the right lane line curve according to the plurality of pixel points on the left lane line curve and the plurality of pixel points on the right lane line curve.

* * * * *